United States Patent [19]

Steuer et al.

[11] E Re. 30,007

[45] Reissued May 22, 1979

[54] HEMATOCRIT MEASUREMENTS BY ELECTRICAL CONDUCTIVITY

[75] Inventors: Robert R. Steuer, Salt Lake City, Utah; Glenn G. Enke, Minneapolis, Minn.

[73] Assignee: United States Surgical Corporation, Stamford, Conn.

[21] Appl. No.: 717,381

[22] Filed: Aug. 24, 1976

Related U.S. Patent Documents

Reissue of:

[64] Patent No.: 3,922,598
Issued: Nov. 25, 1975
Appl. No.: 497,553
Filed: Aug. 15, 1974

[51] Int. Cl.[2] ..... G01N 27/42

[52] U.S. Cl. ..... 324/30 B; 324/30 R

[58] Field of Search ..... 324/30 R, 30 B, 65 P; 204/195 F, 228, 242; 128/2 G, 2.1 E; 350/95

[56] References Cited

U.S. PATENT DOCUMENTS

| | | | |
|---|---|---|---|
| 2,039,219 | 4/1936 | Hausser et al. | 350/95 |
| 2,082,213 | 6/1937 | O'Donnell | 324/30 B |
| 2,215,213 | 9/1940 | Ellis | 324/30 B |
| 2,611,007 | 9/1952 | Cade et al. | 324/30 B |
| 3,115,602 | 12/1963 | Sutton et al. | 324/30 B |
| 3,512,080 | 5/1970 | Hanson | 324/30 B |
| 3,593,119 | 7/1971 | Brum | 324/30 B |
| 3,710,778 | 1/1973 | Cornelius | 324/30 R |
| 3,772,591 | 11/1973 | Louder | 324/30 R |

*Primary Examiner*—M. Tokar
*Attorney, Agent, or Firm*—Fleit & Jacobson

[57] ABSTRACT

Method and apparatus for determining the hematocrit of blood samples from the electrical conductance of whole blood by means of a portable, simple to use instrument with a digital readout. A dip-electrode-probe and/or a "fingerstick"-probe, requiring one drop of blood, have been developed to provide an easy to use and clean electrode system. Electronic improvements further provide for uniformity of readings between observers, automatic operator alert when poor sample contact or insufficient battery power, an exponential solution to the Fricke, Curtis and Maxwell equations and further eliminates electrode polarization by providing a separate DC path to conduct any DC component in the sine-wave signal. A provision is also made to estimate the hemoglobin value from the measured hematocrit.

11 Claims, 5 Drawing Figures

HEMATOCRIT MEASUREMENTS BY ELECTRICAL CONDUCTIVITY

Matter enclosed in heavy brackets [ ] appears in the original patent but forms no part of this reissue specification; matter printed in italics indicates the additions made by reissue.

BACKGROUND AND SUMMARY

This invention relates to an improved, simple method and apparatus (portable) for a direct digital display of the electrical conductance of body fluids, specifically, the hematocrit determination of whole blood specimens.

There are a variety of existing methods and apparatus used for hematocrit determinations but no prior method and/or apparatus exists which determines the hematocrit of blood with a portable, digital display form which only requires diping the electrode-probe into a test tube, or by only placing one drop of blood onto the electrode surfaces, and within 10 seconds have high accuracy, reproducibility and still maintain simplicity of use and ease of electrode cleaning.

Prior art techniques include the classical hematocrit measurement method by centrifugation of blood samples contained in capillary action tubes and then visually measure the relative packed cell height to the total blood sample height. This time consuming method has disadvantages which are well known to those skilled in the art; specifically, the inaccuracies due to technician errors resulting from inadequate sample centrifugation time and visual interpretation.

A second technique computes the hematocrit value from the product of the mean cell volume and the red cell number. By measuring the average population size of the red cells the mean cell volume is determined and simultaneously count the number of red cells diluted in a specific volume of fluid. An electrical conductance technique is utilized to evaluate the mean cell volume and the red cell number; it may give spurious results because of dilution errors and errors due to counting particles other than red cells, i.e., white cells or more than one cell at a time, such as the doublets or triplets.

Other systems measuring the hematocrit by means of electrical conductivity of whole blood may suffer from the inherent errors of bridge balancing circuitry, electrodes which are cumbersome to use and/or difficult to clean; other systems may have errors due to inadequate sample temperature compensation, inadequate polarization and reactance compensation and no non-linear compensation.

This invention, therefore, has the following objects to provide for an improved method and portable apparatus for the direct digital display and simplified measurement of the whole blood hematocrit. This technique provides two types of simple to use and easy to clean electrode probe assemblies which probes are to be used by either: (1) diping the probe directly into a test tube filled with anti-coagulated blood specimen, or: (2) placing one drop of blood onto its surface, covering the surface and the blood with a cover slip and measuring the hematocrit instantly.

Provisions are made whereby electrode polarization tendencies are eliminated and furthermore the sample temperature from 68° F. to 104° F. is compensated for immediately by the thermistor element which is included within the probe assembly.

A further object is to provide a solution to the Fricke, Curtis and Maxwell equations relating the whole blood conductivity to the hematocrit of the sample by means of an exponential approximation to the said equation.

Another object provides for maintaining uniformity between individual observers and to alert said observers automatically of insufficient battery power and/or poor solution-electrode contact.

Also a provision is made for obtaining a hemoglobin estimate as derived from the measured hematocrit value assuming the sample to have normal cell indices.

DESCRIPTION OF THE DRAWINGS

The drawings presented show one preferred embodiment of our invention wherein.

DETAILED DESCRIPTION OF THE INVENTION

Figure 1A:
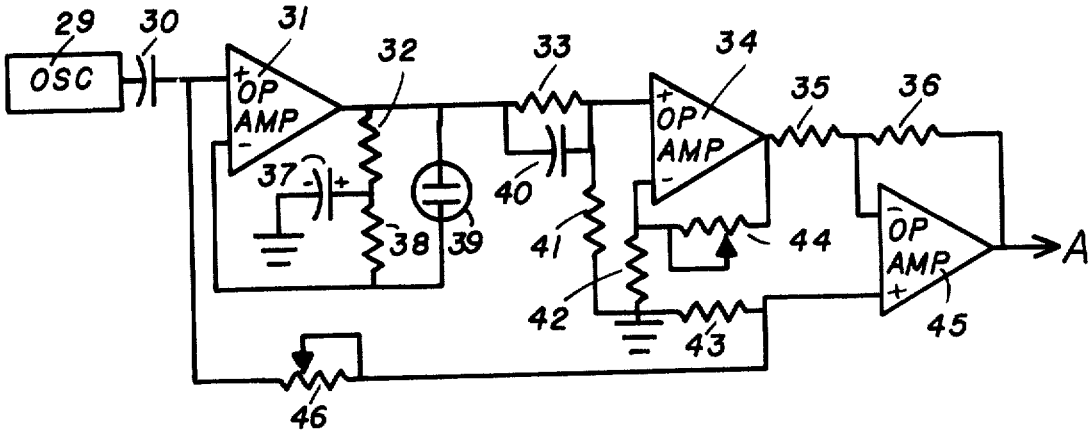
FIG. 1a is a schematic diagram of the electrical sample measurement circuit.
Figure 1B:
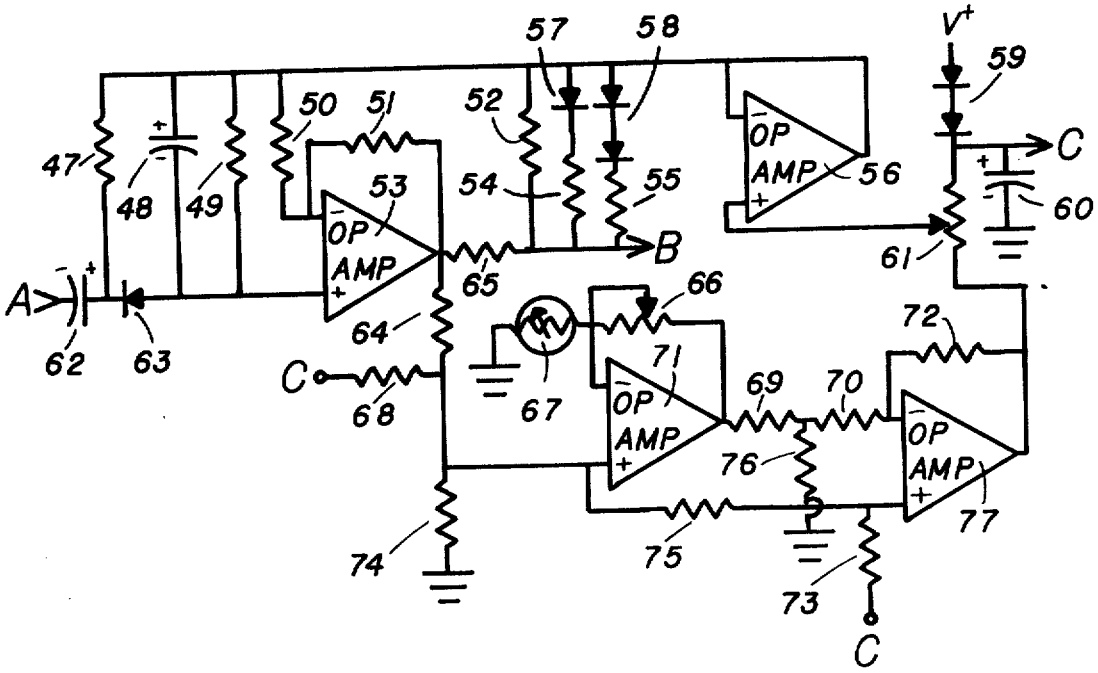
FIG. 1b is a schematic diagram of the electrical circuit performing the non-linear and temperature compensation functions.
Figure 2:
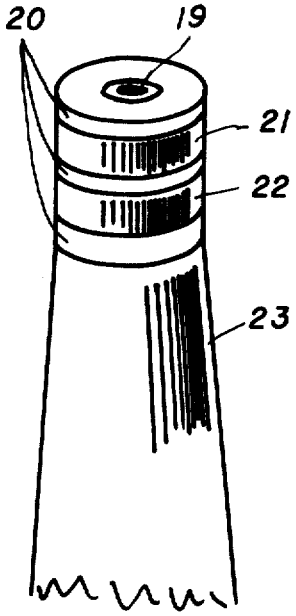
FIG. 2 is a perspective view of the external dip-electrode probe.

Referring to FIG. 2, which illustrates one preferred embodiment of the dip-electrode probe, 23 represents its protective outer stainless steel shell. The stainless steel ring-like electrode surfaces 21 and 22 are insulated by epoxy plastic 20 and are electrically connected to the circuit shown in FIG. 1a, at 39. A negative coefficient thermistor element 19 is embedded flush within the insulator 20 and electrically connected to the circuit shown in FIG. 1b, at 67. The dip-electrode probe is to be immersed in a fixed-dimension test tube containing a pre-anticoagulated whole blood specimen wherein the anticoagulant, EDTA, concentration is not more than 2 milligram per milliliter of blood.

Figure 3:
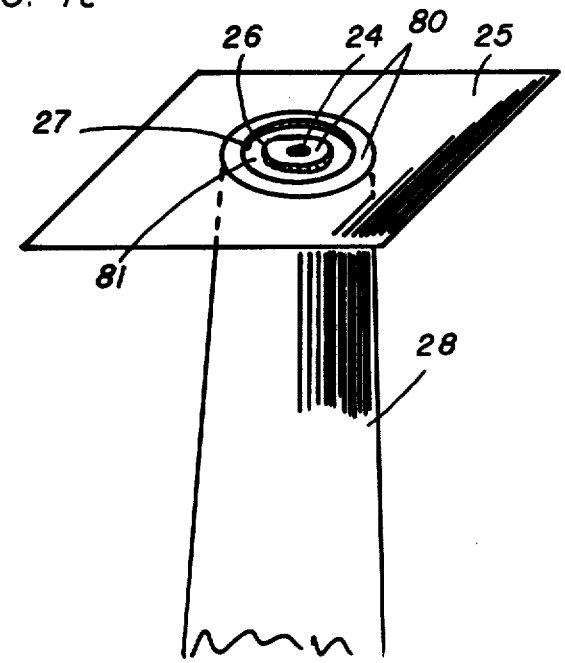
FIG. 3 is a perspective view of the external one-drop, "fingerstick," probe with the required microscope coverslip in place.

Referring to FIG. 3, which illustrates one preferred embodiment of the one-drop, "fingerstick," probe, 28 shows its outer protective stainless steel shell. A fixed volume of whole blood is enclosed between the circumferential stainless steel electrodes 26 and 27 beneath the bottom surface of coverslip 25 and above the top surface of the epoxy plastic insulator 81. Electrodes 26 and 27 are electrically connected to the circuit shown in FIG. 1a, at 39. A negative temperature coefficient thermistor element 24 is embedded flush within the epoxy plastic insulator 80 and electrically connected to the circuit shown in FIG. 1b, at 67. The top edges of electrodes 26 and 27 and the top surfaces of insulators 80 are milled to be flush with the bottom surface of coverslip 25. The one-drop, "fingerstick," probe is to be used by placing one drop of whole blood with anticoagulant, EDTA, concentrations between 0 and 2 milligrams per milliliter, onto surface 81 and immediately placing coverslip 25 onto the sample, thereby enclosing a fixed volume of sample between electrodes 26 and 27.

Either the dip-electrode probe, FIG. 2, or the one-drop "finger-stick," probe, FIG. 3, is intended to be connected to the circuit shown in FIG. 1a, at 39. Each probe requires a different resistor value at 38 because of the cell-constant differences.

Referring to FIG. 1a, a constant current source, generated by a 7 kHz sine was oscillator 29, an operational amplifier (op amp) 31 and current defining resistor 38, is applied to the sample probe 39 to develop a voltage of approximately 2 to 7 volts peak to peak which is linearly related to the electrical resistance of the sample. To prevent polarization of the probe electrodes, a separate electrical path 32 in parallel with the sample probe 39 conducts any DC component that may be required for DC stabilization of op amp 31. Capacitor 30 minimizes the amount of the DC component required in the negative feedback path.

To remove the capacitative reactance exhibited by the blood sample, particularly at low hematocrit values, tuning elements 33 and 40 are inserted ahead of the variable gain op amp 34. Voltage gain is adjusted by potentiometer 44 in order to accomodate variations in electrode dimensions.

Because the output voltage of op amp 31 contains both a variable component from the sample probe 39 and a constant component from the current defining resistor 38, it is necessary to subtract a fixed voltage from this output voltage. In addition, since plasma does not exhibit zero resistance it is necessary to subtract an additional fixed component such that a zero voltage is achieved at the output of op amp 45, A, when the sample probe is measuring plasma. The required amount of fixed voltage is applied to the opposite input of differential op amp 45, and is adjusted by potentiometer 46, where resistors 35, 36 and 43 are used to form this symmetrical differential op amp circuit.

Referring to FIG. 1b, the output voltage A from op amp 45 is half-wave rectified into a negative DC voltage, clamped at the output voltage of op amp 56, which is approximately the positive supply voltage C of the voltage controlled oscillator (VCO) 1, whose control voltage is obtained at B. The output voltage of op amp 53 and B is approximately at C when plasma is sampled, causing VCO 1 to oscillate at a very low frequency giving a digital reading of zero. A sample with high hematocrit value causes the output voltage of op amp 53 to swing negative, a maximum of −4.0 volts, and B to reach a minimum of +2.3 volts, causing the VCO 1 to oscillate near its maximum frequency, giving a high digital reading.

The forward-biased diode-resistor network 65, 52, 54, 55, 57, and 58 is used to provide an inverse mapping, that is, a logarithmic transfer function, to achieve an exponential approximation to the Fricke, Curtis and Maxwell equation. Op amp 56, operating at unity gain, drives a voltage reference bus for the diode-resistor network and the half-wave rectifier circuit to enable a temperature compensating voltage to be subtracted from the VCO control voltge B. Potentiometer 61 adjusts the amount of temperature correction that is applied to op amp 56 from the thermistor amplification circuit, op amps 71 and 77.

To compensate for the decrease in sample resistance with increasing temperature, thermistor 67, in contact with the sample, is employed to increase the hematocrit reading of the instrument, which would otherwise occur. Because thermistor 67 has a negative temperature coefficient, an increase in temperature causes a corresponding increase in the amount of current it conducts, since op amp 71 applies a constant voltage to it. Also the voltage drop across potentiometer 66, which is the sole current path to 67, increases with temperature. The output from op amp 71 is the sum of the thermistor supply voltage and the temperature varying voltage across 66 and is inverted by differential op amp 77 before being applied to potentiometer 61 such that an increase in temperature causes the output of 77 to move away from the voltage at C.

Because the temperature coefficient of a blood sample is inversely related to its hematocrit value, the resistors 64, 68 and 74 are used to apply a positive voltage, varying inversely with sample resistance, to thermistor 67 through op amp 71 so that the amount of temperature compensation introduced by 67 is inversely proportional to the hematocrit. Potentiometer 66 is adjusted to equal the resistance of 67 at the lowest sample temperature permitted, 68° F., causing the output voltage of op amp 71 to be twice its positive input voltage. Equal valued resistors 69 and 76 are used to reduce the output voltage of op amp 71 by one-half, before it is applied to the negative input of differential op amp 77. The positive input of 77 is connected to the positive input voltage of 71 to eliminate this voltage from the thermistor output. Hence, at 68° F., no temperature compensation occurs, regardless of sample resistance.

Figure 1C:
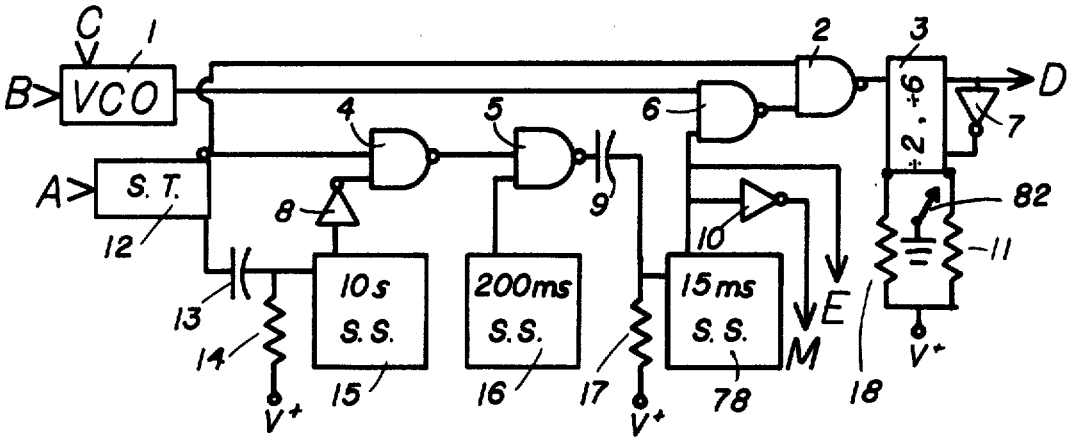
FIG. 1c is a schematic diagram of the electrical analog to digital conversion, display and associated control circuitry.
Figure 1C:
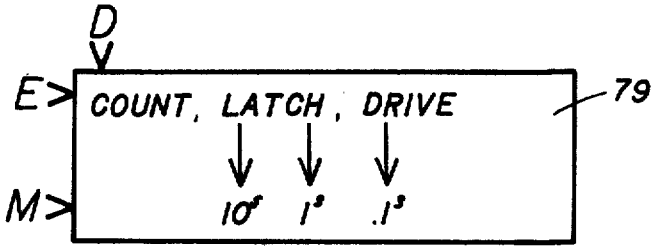

Referring to FIG. 1c, VCO 1 oscillates at a frequency that is linearly related to the analog voltage difference between C and B and this resulting frequency determines the digital display count in 79. A fixed-period single-shot multivibrator 78, triggered by multivibrator 16, is used to gate the output of 1 into counter 3 and thence to D of 79, wherein the counters of 79 are reset by a pulse of M which occurs at the beginning of the period of 78 and sampled by a pulse of E which occurs at the end of the period of 78.

To avoid spurious readings with the probe out of sample contact, Schmitt trigger 12, which sets when the voltage at A exceeds a maximum, blocks the VCO output at NAND gate 2 and causes a reading of 0.0. Reimmersing the probe into the sample clears 12, which also triggers the 10 second multivibrator 15 and reenables NAND gate 2 allowing the VCO signal to reach counter 3. Only during the period of multivibrator 15 the output of multivibrator 78 and hence 10 seconds after immersing the probe in the sample the count is held continuously.

Counter 3 is manually selected by switch 82 to either divide by 2 for hematocrit readings or divide by 6 for the hemoglobin estimates causing the display value in the hemoglobin mode to be one-third of the measured hematocrit value.

Although the preferred embodiment of our invention has been described herein, it is to be understood that the invention is not limited thereby, but is to be determined by the scope of the appended claims:

We claim:

1. An apparatus for displaying in digital form the volume percentage of red cells in a conducting fluid sample comprising:

a. 2 spaced electrodes cooperating with said fluid sample;

b. a sinusoid alternating current source having its constant current output connected to said electrodes;

c. a variable gain amplifier having its input terminals connected to said electrodes;

d. a differential amplifier having its input terminals connected between the output of said variable gain amplifier and the constant voltage output of said alternating current source;

e. rectifying means and DC amplifier connected to the output of said differential amplifier;

f. a dynamic attenuating resistive network, whose output voltage approximates the volume percentage of red red cells in said fluid sample, driven by the output of said DC amplifier;

g. means operable to render said attenuating network output substantially independent of temperature variations of said fluid sample; and h. digital display means driven by the output of said attenuating network to provide direct readout of either the volume percentage of red cells in said fluid sample or the hemoglobin estimate of said fluid sample.

2. The apparatus as in claim 1 wherein filtering means is provided to cause the input signal of said variable gain amplifier to be substantially free of the capacitive reactance component produced by said electrodes.

3. The apparatus as in claim 1 wherein a variable resistance is connected between said constant voltage output of said alternating current source and one input terminal of said differential amplifier, to achieve a null output of said differential amplifier when said fluid sample contains no red cells.

4. The apparatus as in claim 1 wherein said rendering means comprises a negative temperature coefficient thermistor mounted in close proximity to said fluid sample, driven by a dynamically varying DC voltage source, achieving a thermistor current jointly proportional to the temperature and the volume percentage of red cells in said fluid sample and amplifying means to convert the thermistor current to a corresponding DC voltage linearly added to the output of said attenuating network.

5. The apparatus as in claim 1 wherein said digital display means achieves the said hemoglobin estimate readout by reducing the said volume percentage of red cells readout by the ratio 3 to 1.

6. The apparatus as in claim 1 wherein said spaced electrodes comprise first and second conductive areas each having a cylindrical shape, wherein the inner surface of the first conductive area is exposed to said fluid sample and the outer surface of the second conductive area, centered within the first conductive area and of substantially less diameter, is exposed to said fluid sample, and a fixed volume of said fluid sample is confined above said conductive areas by a planar glass cover slip normal to the axis of the cylinders and below by the top surface of an insulator separating the first and second conductive areas.

*7. An apparatus for determining a conductance characteristic of whole blood, the apparatus comprising:*

*base means of insulating material;*

*a region defined by said base means for receiving and holding a liquid sample of whole blood, said region having a volume substantially corresponding to one drop of whole blood;*

*first and second electrodes positioned in spaced-apart relation in said base means with the exposed portions of said electrodes being entirely within the boundaries of said region to be completely covered by and submerged in a one-drop blood sample when same is received in said region, said electrodes being configured so that the path of a current produced by the electric voltage applied between said electrodes is completely contained within the one-drop blood sample received in said region; and*

*means for electrically connecting said first and second electrodes to an electric circuit capable of creating and measuring a current between said electrodes to enable a characteristic of whole blood to be determined.*

*8. The apparatus of claim 7 further comprising a coverslip for enclosing said liquid blood sample in said region.*

*9. The apparatus of claim 7 further comprising temperature sensing means associated with said base and means for electrically connecting said temperature sensing means to an electrical circuit for compensating for temperature variation in said liquid blood sample.*

*10. The apparatus of claim 7, wherein said insulating material is an epoxy plastic.*

*11. The apparatus of claim 7, wherein each of said electrodes are made from stainless steel.*

* * * * *